United States Patent Office.

JAMES HENDERSON, OF NEW YORK, N. Y.

Letters Patent No. 101,263, dated March 29, 1870.

IMPROVEMENT IN THE MANUFACTURE OF IRON AND STEEL.

The Schedule referred to in these Letters Patent and making part of the same.

*To all whom it may concern:*

Be it known that I, JAMES HENDERSON, of the city, county, and State of New York, have invented a new and useful Improvement in the Process of Manufacturing Wrought Iron or Steel; and I do hereby declare that the following is a full, clear, and exact description thereof.

My said invention relates to a process for removing carbon, silicon, sulphur, and phosphorus from crude cast-iron; and consists in the combined use of fluor-spar with titaniferous iron or titaniferous iron ores.

The mode of application of my said process which I have tried with success, and which I deem to be the best, is to remelt pig-iron in a cupola furnace in admixture with titaniferous iron ore and suitable fluxes, and the iron, finely granulated, is put into crucibles, or reverberatory, or refining, or steel-melting or converting furnaces, previously charged with fluor-spar, rendered plastic by being mixed with starch or gum-water, or other equivalent mucilaginous substance, and in that condition applied to the inner surface of the crucibles or furnaces and dried.

When the granulated iron is melted in the crucibles or furnaces so prepared, the heat ignites and burns out the combustible matter of the mucilage, and then dissolves the fluor-spar, which combines with the titanium in the molten metal, and, by reason of the affinities of these two substances for carbon, silicon, sulphur, and phosphorous, these substances are taken from the iron in the form of vapor or slag, leaving the resulting metal to be hammered or rolled as malleable iron, or to be converted into steel.

I have found the following proportions to be suitable, viz:

Seven hundred weight of titaniferous iron ore, such as that found in Norway, and composed of peroxide of iron 22.63; protoxide of iron 28.90; protoxide of manganese, 56.; titanic acid, 40.95; alumina, 2.11; magnesia, 4.72; silica, .42; and two hundred weight of fluor-spar, to the ton of pig-iron.

I do not, however, wish to be understood as limiting my claim of invention to the proportions stated, having merely given the above as suitable for producing good results; nor do I wish to be understood as limiting my claim of invention to the mode above described, for working my said invention, as the titaniferous iron or ores and the fluor-spar may be applied together, as, and if desired, with other fluxes, in any of the processes for treating crude cast-iron for the production of wrought iron or steel.

And it will be obvious, from the foregoing, that titaniferous iron may be substituted for titaniferous iron ores.

Vessels having silicious linings will be injuriously affected by the fluor-spar; therefore, it will be best to avoid silica in the linings, and to use either iron lining or lime limestone, or magnesian limestone, or some other equivalent lining.

What I claim as my invention, and desire to secure by Letters Patent, is—

The combined use of fluor-spar and titaniferous iron ores in the manufacture of wrought iron and steel, as set forth.

JAMES HENDERSON.

Witnesses:
T. B. BEECHER,
J. R. FORREST.